(12) United States Patent
McMechan et al.

(10) Patent No.: US 8,697,613 B2
(45) Date of Patent: *Apr. 15, 2014

(54) TREATMENT FLUIDS COMPRISING FRICTION REDUCERS AND ANTIFLOCCULATION ADDITIVES AND ASSOCIATED METHODS

(75) Inventors: David E. McMechan, Duncan, OK (US); Jimmie D. Weaver, Duncan, OK (US); Thomas D. Welton, Duncan, OK (US); Robert E. Hanes, Jr., Oklahoma City, OK (US); Karen L. King, Duncan, OK (US); Gary P. Funkhouser, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 1523 days.

This patent is subject to a terminal disclaimer.

(21) Appl. No.: 11/367,683

(22) Filed: Mar. 3, 2006

(65) Prior Publication Data

US 2007/0207933 A1 Sep. 6, 2007

(51) Int. Cl.
*C09K 8/04* (2006.01)
*C09K 8/58* (2006.01)

(52) U.S. Cl.
USPC ........... 507/225; 507/222; 507/223; 507/224; 507/227; 507/230; 507/255; 507/267; 507/274; 166/305.1

(58) Field of Classification Search
None
See application file for complete search history.

(56) References Cited

U.S. PATENT DOCUMENTS

| | | | |
|---|---|---|---|
| 3,338,320 A | 8/1967 | Gilson et al. | |
| 3,537,525 A | 11/1970 | Sarem | |
| 3,804,174 A * | 4/1974 | Chatterji et al. | 166/293 |
| 3,959,003 A * | 5/1976 | Ostroot et al. | 106/720 |
| 4,055,502 A * | 10/1977 | Swanson | 507/206 |
| 4,143,716 A * | 3/1979 | Kalfoglou et al. | 166/270.1 |
| 4,323,463 A * | 4/1982 | Morduchowitz | 507/225 |
| 4,374,737 A * | 2/1983 | Larson et al. | 507/130 |
| 4,404,111 A * | 9/1983 | Bi et al. | 507/226 |
| 4,417,989 A | 11/1983 | Hunter | |
| 4,553,601 A | 11/1985 | Almond et al. | |
| 4,592,850 A * | 6/1986 | Castner | 507/226 |
| 4,709,759 A * | 12/1987 | Bock et al. | 166/275 |
| 4,844,163 A * | 7/1989 | Hazlett et al. | 166/270 |
| 4,850,430 A | 7/1989 | Copeland et al. | |
| 5,007,481 A | 4/1991 | Williams et al. | |
| 5,203,834 A * | 4/1993 | Hutchins et al. | 166/270 |
| 5,204,320 A * | 4/1993 | Patel et al. | 507/121 |
| 5,439,059 A | 8/1995 | Harris et al. | |
| 6,662,873 B1 * | 12/2003 | Nguyen et al. | 166/276 |
| 6,784,141 B1 | 8/2004 | King et al. | 507/222 |
| 7,482,310 B1 | 1/2009 | Reese et al. | |
| 2002/0103291 A1 * | 8/2002 | Westerman | 524/814 |
| 2003/0069143 A1 * | 4/2003 | Collins | 507/200 |
| 2003/0092580 A1 * | 5/2003 | Mackey et al. | 507/100 |
| 2003/0234103 A1 * | 12/2003 | Lee et al. | 166/293 |

OTHER PUBLICATIONS

U.S. Appl. No. 11/156,356, filed Jun. 17, 2005, Chatterji, et al.
U.S. Appl. No. 11/300,614, filed Dec. 13, 2005, Chatterji, et al.
U.S. Appl. No. 11/300,615, filed Dec. 13, 2005, Chatterji, et al.
Office action dated Feb. 27, 2008 from U.S. Appl. No. 11/368,221.
Office action dated Feb. 9, 2007 from U.S. Appl. No. 11/368,221.
Office Action for U.S. Appl. No. 11/368,221 dated Nov. 18, 2008.
Office Action for U.S. Appl. No. 11/368,221, dated Aug. 12, 2009.
Chatterji, et al., U.S. Appl. No. 11/156,356, filed Jun. 17, 2005.
Chatterji, et al., U.S. Appl. No. 11/300,614, filed Dec. 13, 2005.
Chatterji, et al., U.S. Appl. No. 11/300,615, filed Dec. 13, 2005.
Office Action for U.S. Appl. No. 11/368,221, dated May 14, 2009.
Office Action for U.S. Appl. No. 11/368,221 dated Mar. 4, 2010.
Notice of Allowance for U.S. Appl. No. 11/368,221 dated Jul. 15, 2010.

* cited by examiner

*Primary Examiner* — John J Figueroa
(74) *Attorney, Agent, or Firm* — McDermott Will & Emery LLP; Craig W. Roddy

(57) ABSTRACT

Methods comprising: providing an aqueous treatment fluid comprising an aqueous fluid, a friction reducing polymer, and an antiflocculation additive; and introducing the treatment fluid into a subterranean formation. Methods of fracturing a subterranean formation comprising: providing an aqueous treatment fluid comprising an aqueous fluid, a friction reducing polymer, and an antiflocculation additive; and introducing the treatment fluid into a well bore penetrating the subterranean formation at rate in the range of from about 30 barrels to about 250 barrels per minute so as to create or enhance one or more fractures in the subterranean formation. Aqueous treatment fluids comprising: an aqueous fluid, a friction reducing polymer in an amount sufficient to reduce friction without forming a gel, and an antiflocculation additive.

9 Claims, No Drawings

TREATMENT FLUIDS COMPRISING FRICTION REDUCERS AND ANTIFLOCCULATION ADDITIVES AND ASSOCIATED METHODS

CROSS-REFERENCE TO RELATED APPLICATIONS

The present invention is related to U.S. patent application Ser. No. 11/368,221, entitled "Treatment Fluids Comprising Friction Reducers and Antiflocculation Additives and Associated Methods," filed on the same date herewith, the entire disclosure of which is incorporated herein by reference.

BACKGROUND

The present invention relates to methods and compositions useful in subterranean treatments, and more particularly, the present invention relates to the use of antiflocculation additives to reduce the tendency of friction reducing polymers used in subterranean treatments to form undesirable flocs. The term "antiflocculation additive" as used herein, refers to compositions capable of reducing the tendency of friction reducing polymers to form undesirable flocs. The term "floc" as used herein, refers to a coagulated mass of particles in a liquid.

Aqueous treatment fluids may be used in a variety of subterranean treatments. Such treatments include, but are not limited to, drilling operations, stimulation operations, and completion operations. As used herein, the term "treatment," or "treating," refers to any subterranean operation that uses a fluid in conjunction with a desired function and/or for a desired purpose. The term "treatment," or "treating," does not imply any particular action by the fluid.

During the placement of aqueous treatment fluids into a well bore, a considerable amount of energy may be lost due to friction between the treatment fluid in turbulent flow and the formation and/or tubular goods (e.g., pipes, coiled tubing, etc.) disposed within the well bore. As a result of these energy losses, additional horsepower may be necessary to achieve the desired treatment. To reduce these energy losses, friction reducing polymers have heretofore been included in aqueous treatment fluids. The term "friction reducing polymer," as used herein, refers to a polymer that reduces frictional losses due to friction between an aqueous fluid in turbulent flow and tubular goods (e.g. pipes, coiled tubing, etc.) and/or the formation. The term "polymer," as used herein, is also intended to include both the acid form of the friction reducing polymer and its various salts. These friction reducing polymers may be synthetic polymers, natural polymers, or viscoelastic surfactants and are thought to reduce the friction between the aqueous treatment fluid in turbulent flow and the tubular goods and/or the formation.

One problem that may adversely affect friction reduction is the tendency of certain friction reducing polymers to function as flocculants. It is believed that the ionic nature of certain friction reducing polymers may cause these polymers to interact with formation fines and thereby form flocs. The resulting flocs may be undesirable because, among other things, the flocs may facilitate the formation of agglomerates that may clog pumps, filters, surface equipment and possibly plug fractures. Additionally, flocs may also reduce the fluid conductivity in the formation by adsorbing onto fracture faces within the formation or by possibly forming a stable emulsion in the formation that impacts subsequent production from the well bore.

An example of a subterranean treatment utilizing an aqueous treatment fluid is hydraulic fracturing. Hydraulic fracturing is a process commonly used to increase the flow of desirable fluids, such as oil and gas, from a portion of a subterranean formation. In hydraulic fracturing, a fracturing fluid is introduced into the subterranean formation at or above a pressure sufficient to create or enhance one or more fractures therein. Enhancing a fracture includes enlarging a pre-existing fracture in the formation. To reduce frictional energy losses between the fracturing fluid and/or the formation, friction reducing polymers may be included in the fracturing fluid. One type of hydraulic fracturing operation that may utilize friction reducing polymers is commonly referred to as a "high-rate water fracturing" operation. Typically, high-rate water fracturing is utilized in subterranean formations with low permeability (e.g., no more than about 0.1 millidarcy). Unlike conventional fracturing fluids, fluids used in high-rate water fracturing generally do not contain a sufficient amount of a water-soluble polymer to form a gel. Gel formation is based on a number of factors including the particular polymer and concentration thereof, temperature, and a variety of other factors known to those of ordinary skill in the art. As a result, the fracturing fluids used in these high-rate water fracturing operations generally have a lower viscosity than traditional fracturing fluids.

SUMMARY

The present invention relates to methods and compositions useful in subterranean treatments, and more particularly, the present invention relates to the use of antiflocculation additives to reduce the tendency of friction reducing polymers used in subterranean treatments to form undesirable flocs.

In one embodiment, the present invention provides a method comprising: providing an aqueous treatment fluid comprising an aqueous fluid, a friction reducing polymer, and an antiflocculation additive; and introducing the treatment fluid into a subterranean formation.

In another embodiment, the present invention provides a method comprising: providing an aqueous treatment fluid comprising an aqueous fluid, a friction reducing polymer in an amount sufficient to reduce friction without forming a gel, and an antiflocculation additive; and introducing the treatment fluid into a subterranean formation.

In another embodiment, the present invention provides a method of fracturing a subterranean formation comprising: providing an aqueous treatment fluid comprising an aqueous fluid, a friction reducing polymer, and an antiflocculation additive; and introducing the treatment fluid into a well bore penetrating the subterranean formation at rate in the range of from about 30 barrels to about 250 barrels per minute so as to create or enhance one or more fractures in the subterranean formation.

In another embodiment, the present invention provides an aqueous treatment fluid comprising: an aqueous fluid, a friction reducing polymer in an amount sufficient to reduce friction without forming a gel, and an antiflocculation additive.

In yet another embodiment, the present invention provides an aqueous treatment fluid comprising: an aqueous fluid, a friction reducing polymer, and an antiflocculation additive, wherein the aqueous treatment fluid has a viscosity in the range of from about 1 centipoise to about 30 centipoise.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to methods and compositions useful in subterranean treatments, and more particularly, the present invention relates to the use of antiflocculation additives to reduce the tendency of friction reducing polymers used in subterranean treatments to form undesirable flocs. While the compositions and methods of the present invention may be suitable for use in a variety of subterranean treatments, they may be particularly useful in high-rate water fracturing treatments.

The aqueous treatment fluids of the present invention generally comprise an aqueous fluid, a friction reducing polymer, and an antiflocculation additive. Generally, the aqueous treatment fluids are not relying on viscosity for proppant transport. In some embodiments, the aqueous treatment fluid should have a viscosity in the range from about 1 centipoise ("cp") to about 30 cp. In some embodiments, the aqueous treatment fluid should have a viscosity in the range from about 1 cp to 25 cp. For purposes of this disclosure, viscosities are measured at room temperature using a Fann Model 35 viscometer at 300 rpm.

Suitable aqueous fluids that may be used in the present invention include fresh water, salt water, brine, seawater, or combinations thereof. Generally, the water used may be from any source, provided that it does not contain an excess of compounds that may adversely affect the other components used in accordance with this invention or the subterranean formation. For example, it is believed that high salt concentrations (e.g., saturated salt solutions) may undesirably interact with certain friction reducing polymers, such as copolymers of acrylamide and acrylic acid.

Suitable friction reducing polymers for use in the present invention should, among other things, reduce energy losses due to friction in the aqueous treatment fluids of the present invention. For example, friction reducing polymers suitable for use in the present invention may reduce energy losses during introduction of the aqueous treatment fluid into a well bore due to friction between the aqueous treatment fluid in turbulent flow and the formation and/or tubular good(s) (e.g., a pipe, coiled tubing, etc.) disposed in the well bore. Any friction reducing polymer suitable for use in subterranean applications may be suitable for use in the present invention. Additionally, friction reducing polymers suitable for use in the present invention may be polymers and/or copolymers. The term "copolymer," as used herein, is not limited to polymers comprising two types of monomeric units, but includes any combination of monomeric units, e.g., terpolymers, tetrapolymers, and the like. An example of a suitable friction reducing polymer comprises a quaternized aminoalkyl acrylate, such as a copolymer of acrylamide and dimethylaminoethyl acrylate quaternized with benzyl chloride. Another example of a suitable friction reducing polymer comprises acrylamide. An example of a suitable friction reducing polymer comprising acrylamide is a copolymer of acrylamide and acrylic acid. Such friction reducing polymers may further comprise additional monomers, such as 2-acrylamido-2-methylpropanesulfonic acid, N,N-dimethyl acrylamide, vinylsulfonic acid, N-vinyl acetamide, N-vinyl formamide, and mixtures thereof. Other examples of suitable friction reducing polymers are described in U.S. Pat. No. 6,784,141, U.S. patent application Ser. No. 11/156,356, U.S. patent application Ser. No. 11/300,614, and U.S. patent application Ser. No. 11/300,615, the disclosure of which is incorporated herein by reference. Combinations of suitable friction reducing polymers may also be suitable for use.

The friction reducing polymers should have a molecular weight sufficient to provide a desired level of friction reduction. Generally, friction reducing polymers having higher molecular weights may be needed to provide a desirable level of friction reduction. For example, in some embodiments, the average molecular weight of the friction reducing polymers may be in the range of from about 7,500,000 to about 20,000,000, as determined using intrinsic viscosities. Those of ordinary skill in the art will recognize that friction reducing polymers having molecular weights outside the listed range may still provide some degree of friction reduction in an aqueous treatment fluid.

The friction reducing polymers should be included in the aqueous treatment fluids of the present invention in an amount sufficient to provide the desired reduction of friction without forming a gel. Formation of a gel is dependent on a number of factors including the particular friction reducing polymer used, concentration of the friction reducing polymer, temperature, and a variety of other factors known to those of ordinary skill in the art. While the addition of friction reducing polymers may minimally increase the viscosity of the aqueous treatment fluids, the polymers are generally not included in the aqueous treatment fluids of the present invention in an amount sufficient to substantially increase in viscosity. In some embodiments, the friction reducing polymer may be present in an amount in the range of from about 0.01% to about 0.5% by weight of the aqueous treatment fluid. In some embodiments, the friction reducing polymer may be present in an amount in the range of from about 0.025% to about 0.25% by weight of the aqueous treatment fluid.

The friction reducing polymers may be provided in any suitable form, including in a solid form, as an oil-external emulsion polymer, or as a component of an aqueous solution. In embodiments where a particular friction reducing polymer is provided as an oil-external emulsion polymer, the oil-external emulsion polymer may comprise water, a water-immiscible liquid, an emulsifying surfactant, and a friction reducing polymer. Suitable oil-external emulsion polymer further may comprise inhibitors, salts, and inverters. As those of ordinary skill in the art will appreciate, with the benefit of this disclosure, upon addition to the aqueous treatment fluid, the emulsion should invert, releasing the friction reducing polymer into the aqueous treatment fluid.

The antiflocculation additives are generally included in the aqueous treatment fluids of the present invention for reducing the formation of undesirable flocs therein. For example, the antiflocculation additives should be capable of reducing and/or preventing the friction reducing polymers from forming undesirable flocs in the aqueous treatment fluids. Suitable antiflocculation additives may comprise oxidizers, surfactants, or combinations thereof.

In one embodiment, suitable antiflocculation additives may comprise oxidizers. Among other things, the oxidizer should modify the polymer backbone of the friction reducing polymers, thereby reducing and/or preventing the tendency of these friction reducing polymers from forming flocs in the aqueous treatment fluids. Suitable oxidizers should be capable of lowering the molecular weight of the friction reducing polymers. Examples of suitable oxidizers include sodium bromate, peroxygen compounds, and salts (such as sodium, potassium, ammonium, etc.) of peroxygen compounds such as persulfate, permanganate, periodate, perbromate, perborate, percarbonate, monopersulfuric acid, dipersulfuric acid, diperphosphate, dichromate, or metaperiodate.

Examples include but are not limited to sodium persulfate, potassium persulfate, ammonium persulfate, sodium permanganate, potassium permanganate, sodium perborate, sodium percarbonate, hydrogen peroxide, potassium diperphosphate, tert-butyl hydroperoxide, potassium diperphosphate, ammonium monopersulfuric acid, sodium dichromate, potassium dichromate, sodium carbonate peroxide, potassium periodate, and/or sodium periodate. Combinations of suitable oxidizers also may be used. Certain oxidizers, such as sodium persulfate, may generate undesirable byproducts depending upon conditions occurring within the subterranean formation. One of ordinary skill in the art, with the benefit of this disclosure, will be able to select an appropriate oxidizer based on a number of factors including, the temperature of the subterranean formation, the chemical composition of the formation fluids, and the composition of the friction reducing polymer.

When an oxidizer is used as the antiflocculation additive, significant oxidation of the friction reducing polymer should not occur prior to introduction of the aqueous treatment fluid into the subterranean formation. Additionally, the oxidizer should be present in the aqueous treatment fluids of the present invention in an amount sufficient to provide the desired reduction in the tendency of the friction reducing polymers to form undesirable flocs. In some embodiments, the oxidizer is present in the aqueous treatment fluids in an amount in the range from about 0.001% to about 3% by weight of the aqueous treatment fluid. In certain embodiments, the oxidizer is present in the aqueous treatment fluids in an amount in the range from about 0.005% to about 0.2% by weight of the aqueous treatment fluid. The amount of the oxidizer included in a particular aqueous treatment fluid of the present invention may depend upon, among other factors, the temperature of the subterranean formation, the chemical composition of the formation fluids, the composition of the friction reducing polymer, the type of subterranean operation being conducted, the phase of the subterranean operation, and the like.

In one embodiment, suitable antiflocculation additives may comprise a surfactant. Suitable surfactants for use with anionic friction reducers should be anionic and/or nonionic water wetting surfactants capable of modifying the wetting properties of the friction reducing polymers to reduce the tendency of the friction reducing polymers to form undesirable flocs in the aqueous treatment fluids. Suitable surfactants for use with cationic friction reducers should be cationic and/or nonionic water wetting surfactants capable of modifying the wetting properties of the friction reducing polymers to reduce the tendency of the friction reducing polymers to form undesirable flocs in the aqueous treatment fluids. Suitable surfactants include, sulfonates, alkyl sulfates, and monoesters of polyalkoxylated sorbitan. Examples of suitable sulfonate surfactants include, but are not limited to, alkylsulfonate, alkylarylsulfonate, α-olefin sulfonate, diphenyl ether sulfonate and α-sulfo fatty acid methyl ester. Combinations of suitable surfactants also may be used. An example of a suitable surfactant comprises a tall oil fatty acid diethanolamide, such as AMADOL® 511, available from Akzo Nobel Surface Chemistry, Chicago, Ill. Another example of a suitable surfactant comprises a polyoxyethylene (5) sorbitan monooleate, such as TWEEN® 81, available from Uniqema, New Castle, Del. Another example of a suitable surfactant comprises a sorbitan monooleate, such as ALKAMULS® SMO, available from Rhone Poulenc, Inc., Paris, France. Combinations of these surfactants also may be suitable. One of ordinary skill in the art, with the benefit of this disclosure, will be able to select an appropriate surfactant based on a number of factors, including the temperature of the subterranean formation, the chemical composition of the formation fluids, the composition of the friction reducing polymer, and the like.

In those embodiments where the antiflocculation additive comprises a surfactant, the surfactant should be present in the aqueous treatment fluids of the present invention in an amount sufficient to provide the desired reduction in the tendency of the friction reducing polymers to form undesirable flocs. In some embodiments, the surfactant is present in the aqueous treatment fluids in an amount in the range from about 0.05% to about 0.5% by weight of the aqueous treatment fluid. In certain embodiments, the surfactant is present in the aqueous treatment fluids in an amount in the range from about 0.1% to about 0.2% by weight of the aqueous treatment fluid. The amount of the surfactant included in a particular aqueous treatment fluid of the present invention may depend upon, among other factors, the temperature of the subterranean formation, the chemical composition of the formation fluids, the composition of the friction reducing polymer, and the like.

In accordance with the methods and compositions of the present invention, in some embodiments, all or part of the antiflocculation additive may be added to the aqueous treatment fluid on-the-fly. The term "on-the-fly" is used herein to mean that a flowing stream is continuously introduced into another flowing stream so that the streams are combined and mixed while continuing to flow as a single stream.

Additional additives may be included in the aqueous treatment fluids of the present invention as deemed appropriate by one of ordinary skill in the art, with the benefit of this disclosure. Examples of such additives include, but are not limited to, clay stabilizers, shale inhibitors, corrosion inhibitors, proppant particulates, acids, fluid loss control additives, and surfactants. For example, an acid may be included in the aqueous treatment fluids, among other things, for a fracture acidizing treatment.

The aqueous treatment fluids of the present invention may be used in any subterranean treatment where the reduction of undesirable flocculation due to friction reducing polymers is desired. Such subterranean treatments include, but are not limited to, drilling operations, stimulation treatments (e.g., fracturing treatments, acidizing treatments, fracture acidizing treatments), and completion operations. While the compositions and methods of the present invention may be suitable for use in a variety of subterranean treatments, they may be particularly useful in high-rate water fracturing treatments. Those of ordinary skill in the art, with the benefit of this disclosure, will be able to recognize a suitable subterranean treatment where flocculation reduction may be desired.

In some embodiments, the present invention provides a method of treating a subterranean formation, comprising: providing an aqueous treatment fluid of the present invention comprising an aqueous fluid, a friction reducing polymer, and an antiflocculation additive; and introducing the aqueous treatment fluid into the subterranean formation; and allowing the antiflocculation additive to reduce flocculation. In some embodiments, the aqueous treatment fluid may be introduced into the subterranean formation at or above a rate and pressure sufficient to create or enhance one or more fractures in the subterranean formation. In some embodiments, the aqueous treatment fluid may be introduced into the subterranean formation at a rate of about 30 bpm to about 250 bpm. In some embodiments, the aqueous treatment fluid may be introduced into the subterranean formation at a rate of about 50 bpm to about 175 bpm.

To facilitate a better understanding of the present invention, the following examples of certain aspects of some embodiments are given. In no way should the following examples be read to limit, or define, the scope of the invention.

EXAMPLE 1

Flocculation tests, such as emulsion break tests, were performed by preparing sample treatment fluids comprising water, FR-26LC™ friction reducer in an amount of 1 gallon per 1,000 gallons, and various concentrations of an oxidizer (sodium perborate tetrahydrate) that were placed in a 160° F. water bath for 72 hours. Sample Treatment Fluid No. 1 did not include any of the oxidizer, Sample Treatment Fluid No. 2 included the oxidizer in an amount of 0.25 pounds per 1,000 gallons ("ppg"), Sample Treatment Fluid No. 3 included the oxidizer in an amount of 0.5 ppg, Sample Treatment Fluid No. 4 included the oxidizer in an amount of 0.75 ppg, and Sample Treatment Fluid No. 5 included the oxidizer in an amount of 1 ppg. After preparation, an emulsion break test was performed on each sample.

The emulsion break tests for the sample treatment fluids were performed in accordance with the procedure listed below. In a 4 ounce graduated glass jar, 0.02 grams of calcium carbonate fines were added to 50 milliliters of a sample treatment fluid. The jar was than agitated, and 50 milliliters of kerosene were added to the mixture of the sample treatment fluid and the calcium carbonate fines. Next, the jar was shaken for 30 seconds to form an emulsion. Thereafter, the jar was observed, and the emulsion break rate was recorded. Samples that had an emulsion at 10 minutes were returned to the water bath and removed for observation at indicated intervals for up to 1 hour. Additionally, the water level and oil level at each interval was recorded. Finally, observations of the emulsion at the oil/water interface and any increased turbidity caused by fines flocculation were recorded. The results of these emulsion break tests are given in the tables below:

TABLE 1

Sample Treatment Fluid No. 1

| Time (min) | Water Level (mL) | Oil Level (mL) | Presence of Visible Emulsion |
| --- | --- | --- | --- |
| 1 | — | — | Yes |
| 5 | — | — | Yes |
| 10 | — | — | Yes |
| 15 | 35 | 87 | Yes |
| 20 | 40 | 80 | Yes |
| 60 | 45 | 60 | Yes |

TABLE 2

Sample Treatment Fluid No. 2

| Time (min) | Water Level (mL) | Oil Level (mL) | Presence of Visible Emulsion |
| --- | --- | --- | --- |
| 1 | 49 | 55 | Yes with air bubbles at interface |
| 5 | 50 | 52 | Yes with air bubbles at interface |
| 10 | 50 | 50 | Yes |
| 15 | 50 | 50 | Slight |
| 30 | 50 | 50 | Slight |

TABLE 3

Sample Treatment Fluid No. 3

| Time (min) | Water Level (mL) | Oil Level (mL) | Presence of Visible Emulsion |
| --- | --- | --- | --- |
| 1 | 45 | 54 | Air bubbles at interface |
| 5 | 46 | 54 | Yes |
| 14 | 48 | 51 | Yes |
| 22 | 50 | 50 | No |

TABLE 4

Sample Treatment Fluid No. 4

| Time (min) | Water Level (mL) | Oil Level (mL) | Presence of Visible Emulsion |
| --- | --- | --- | --- |
| 1 | 48 | 51 | Air bubbles at interface |
| 5 | 48 | 51 | Yes |
| 14 | 49 | 51 | No |
| 22 | 50 | 50 | No |

TABLE 5

Sample Treatment Fluid No. 5

| Time (min) | Water Level (mL) | Oil Level (mL) | Presence of Visible Emulsion |
| --- | --- | --- | --- |
| 1 | 49 | 49 | Air bubbles at interface |
| 5 | 50 | 50 | Air bubbles at interface |
| 10 | 50 | 50 | Slight |
| 15 | 50 | 50 | No |
| 20 | 50 | 50 | No |

EXAMPLE 2

Centrifuge interface tests were also performed on the sample treatment fluids prepared in Example 1. These centrifuge interface tests were performed in accordance with the procedure listed below. In a 250 milliliter Erlenmeyer flask, 0.25 grams of calcium carbonate fines were added to 100 milliliters of a sample treatment fluid. The mixture was then stirred using a magnetic stir plate, and 100 milliliters of kerosene were added to the mixture of the sample treatment fluid and the calcium carbonate fines. The mixture containing the sample treatment fluid, calcium carbonate fines, and kerosene was then stirred vigorously for 2 minutes to form an emulsion. Next, 30 milliliters of the mixture were then immediately poured into a conical centrifuge tube and centrifuged for 10 minutes. Observations of the emulsion at the oil/water interface and any increased turbidity caused by fines flocculation were then recorded. The results of the centrifuge interface test are given below.

The oil/water interface of Sample Treatment Fluid No. 1 (control) had a very thick layer of emulsion at the interface which was not fluid at all. Calcium carbonate fines were not present at the bottom of the conical centrifuge tube suggesting a very intense flocculation property.

The oil/water interface of Sample Treatment Fluid No. 2 had a layer of emulsion at the interface that had a thickness similar to Sample Treatment Fluid No. 1 (control); however, calcium carbonate fines were present at the bottom of the centrifuge tube. This suggests that the flocculation properties of the sample were altered.

The oil/water interface of Sample Treatment Fluid No. 3 had a thinner layer of emulsion at the interface than that of Sample Treatment Fluid No. 2. This suggests that Sample Treatment Fluid No. 3 had less flocculating properties than that of Sample Treatment Fluid No. 2. Additionally, calcium carbonate fines were present at the bottom of the centrifuge tube.

The oil/water interface of Sample Treatment Fluid No. 4 had a thinner layer of emulsion at the interface than that of Sample Treatment Fluid No. 3 suggesting a reduction in flocculation properties. Calcium carbonate fines were present at the bottom of the centrifuge tube.

The oil/water interface of Sample Treatment Fluid No. 5 had a very thin layer of emulsion at the interface and was fluid. The majority of calcium carbonate fines settled to the bottom of the centrifuge tube. This suggested that there were very little flocculation properties left in Sample Treatment Fluid No. 5.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. An aqueous treatment fluid comprising:
    an aqueous fluid;
    a friction reducing polymer, wherein the friction reducing polymer is present in the aqueous treatment fluid in an amount sufficient to produce a viscosity of the aqueous treatment fluid in the range of from about 1 centipoise to about 25 centipoise and the friction reducing polymer does not form a gel in the aqueous treatment fluid; and
    an antiflocculation additive selected from the group consisting of: sodium permanganate, potassium permanganate, sodium percarbonate, potassium diperphosphate, potassium diperphosphate, ammonium monopersulfuric acid, sodium dichromate, potassium dichromate, potassium periodate, sodium periodate, diphenyl ether sulfonate, an alpha-sulfo fatty acid methyl ester, diphenyl ether sulfonate, α-sulfo fatty acid methylester, and combinations thereof.

2. The aqueous treatment fluid of claim 1 wherein the friction reducing polymer comprises at least one monomer selected from the group consisting of quaternized aminoalkyl acrylate, acrylamide, 2-acrylamido-2-methylpropanesulfonic acid, N,N-dimethyl acrylamide, vinylsulfonic acid, N-vinyl acetamide, N-vinyl formamide, dimethylaminoethyl acrylate quaternized with benzyl chloride, acrylic acid, and combinations thereof.

3. The aqueous treatment fluid of claim 1 wherein the friction reducing polymer is present in the aqueous treatment fluid in an amount in the range of from about 0.025% to about 0.25% by weight of the aqueous treatment fluid.

4. The aqueous treatment fluid of claim 1 wherein the antiflocculation additive comprises an oxidizer in an amount in the range of from about 0.005% to about 0.2% by weight of the aqueous treatment fluid.

5. The aqueous treatment fluid of claim 1 wherein the antiflocculation additive comprises a surfactant in an amount in the range of from about 0.1% to about 0.2% by weight of the aqueous treatment fluid.

6. An aqueous treatment fluid comprising:
    an aqueous fluid;
    a friction reducing polymer, wherein the friction reducing polymer is present in the aqueous treatment fluid in an amount sufficient to produce a viscosity of the aqueous treatment fluid in the range of from about 1 centipoise to about 25 centipoise and the friction reducing polymer does not form a gel in the aqueous treatment fluid and wherein the friction reducing polymer is present in an amount from about 0.025 to about 0.25% by weight of the aqueous treatment fluid; and
    an antiflocculation additive selected from the group consisting of: permanganate, potassium permanganate, sodium percarbonate, potassium diperphosphate, potassium diperphosphate, ammonium monopersulfuric acid, sodium dichromate, potassium dichromate, potassium periodate, sodium periodate, diphenyl ether sulfonate, an alpha-sulfo fatty acid methyl ester, diphenyl ether sulfonate, and combinations thereof.

7. The aqueous treatment fluid of claim 6 wherein the friction reducing polymer comprises at least one monomer selected from the group consisting of quaternized aminoalkyl acrylate, acrylamide, 2-acrylamido-2-methylpropanesulfonic acid, N,N-dimethyl acrylamide, vinylsulfonic acid, N-vinyl acetamide, N-vinyl formamide, dimethylaminoethyl acrylate quaternized with benzyl chloride, acrylic acid, and combinations thereof.

8. The aqueous treatment fluid of claim 6 wherein the antiflocculation additive comprises an oxidizer in an amount in the range of from about 0.005% to about 0.2% by weight of the aqueous treatment fluid.

9. The aqueous treatment fluid of claim 6 wherein the antiflocculation additive comprises a surfactant in an amount in the range of from about 0.1% to about 0.2% by weight of the aqueous treatment fluid.

* * * * *